United States Patent
Coolidge et al.

(10) Patent No.: US 8,968,520 B2
(45) Date of Patent: Mar. 3, 2015

(54) COAL PROCESSING TO UPGRADE LOW RANK COAL HAVING LOW OIL CONTENT

(75) Inventors: Dennis W. Coolidge, Palm Coast, FL (US); Deane A. Horne, Toledo, OH (US); Ronn G. Smith, Sheridan, WY (US)

(73) Assignee: National Institute of Clean and Low-Carbon Energy (NICE), Beijing (CN)

( * ) Notice: Subject to any disclaimer, the term of this patent is extended or adjusted under 35 U.S.C. 154(b) by 927 days.

(21) Appl. No.: 13/152,878

(22) Filed: Jun. 3, 2011

(65) Prior Publication Data
US 2012/0305379 A1 Dec. 6, 2012

(51) Int. Cl.
*C10B 57/10* (2006.01)
*C10B 49/00* (2006.01)
*C10L 9/08* (2006.01)
*C10B 39/04* (2006.01)
*C10B 49/10* (2006.01)
*C10F 5/06* (2006.01)

(52) U.S. Cl.
CPC .............. *C10B 57/10* (2013.01); *C10L 2290/02* (2013.01); *C10L 2290/08* (2013.01); *C10L 2290/10* (2013.01); *C10L 9/083* (2013.01); *C10L 2290/543* (2013.01); *C10B 39/04* (2013.01); *C10B 49/10* (2013.01); *C10L 9/08* (2013.01); *C10F 5/06* (2013.01)
USPC .................... 201/14; 201/24; 201/27; 201/29; 201/30; 201/37; 44/592; 44/608; 44/626; 34/363

(58) Field of Classification Search
CPC . C10L 9/083; C10L 2290/02; C10L 2290/08; C10L 2290/10; C10L 2290/543; C10B 49/00; C10B 57/04; C10B 57/10; Y02E 50/14; Y02E 50/15; F26B 3/02
USPC ................ 201/14, 15, 24, 27, 29, 30, 32, 37; 202/108; 44/592, 605, 606, 608, 620, 44/622, 626; 34/60, 86, 314, 330, 363
See application file for complete search history.

(56) References Cited

U.S. PATENT DOCUMENTS 1,814,980 A 7/1931 Wessel
1,976,908 A 10/1934 Wittenberg
(Continued)

OTHER PUBLICATIONS

Berkowitz N., An Introduction to Coal Technology, 1994, 2nd Edition, pp. 102-103; 164-165.
(Continued)

*Primary Examiner* — Prem C Singh
*Assistant Examiner* — Jonathan Miller
(74) *Attorney, Agent, or Firm* — MacMillan, Sobanski & Todd, LLC

(57) ABSTRACT

A method of treating untreated low calorific coal containing moisture and organic volatiles includes feeding untreated coal to a dryer, and drying the coal. The dried coal is subjected to a pyrolyzing step where oxygen-deficient gases are brought into contact with the coal, thereby lowering the volatile content of the coal and producing a stream of pyrolysis effluent gases. The pyrolysis effluent gases are subjected to a separation process to separate lean fuel gases from liquids and tars, wherein the separation process removes less than about 20 percent of the pyrolysis effluent gases as the liquids and tars, with the remainder being the lean fuel gases. The lean fuel gases are returned to the dryer combustor, the pyrolyzer combustor, or the pyrolyzer.

22 Claims, 1 Drawing Sheet

(56) References Cited

U.S. PATENT DOCUMENTS

| | | |
|---|---|---|
| 2,029,883 A | 2/1936 | MacCubbin et al. |
| 2,040,100 A | 5/1936 | Miller |
| 2,044,764 A | 6/1936 | Bywater |
| 2,260,072 A | 10/1941 | Wilton |
| 2,366,900 A | 1/1945 | Weir |
| 2,528,553 A | 11/1950 | Royster |
| 2,666,796 A | 1/1954 | Gorin et al. |
| 2,693,409 A | 11/1954 | Stephens, Jr. |
| 2,748,063 A | 5/1956 | Radasch |
| 2,774,716 A | 12/1956 | Kulik |
| 3,010,893 A | 11/1961 | Kulik |
| 3,375,175 A | 3/1968 | Eddinger et al. |
| 3,463,310 A | 8/1969 | Ergun et al. |
| 3,574,065 A | 4/1971 | Eddinger et al. |
| 3,585,732 A | 6/1971 | Itahashi |
| 3,736,233 A | 5/1973 | Sass et al. |
| 3,938,966 A | 2/1976 | Kindig et al. |
| 4,028,219 A | 6/1977 | Baldwin et al. |
| 4,036,603 A | 7/1977 | Bernet et al. |
| 4,052,170 A | 10/1977 | Yan |
| 4,119,523 A | 10/1978 | Baldwin et al. |
| 4,146,367 A | 3/1979 | Hsu |
| 4,149,939 A | 4/1979 | Solano |
| 4,156,595 A | 5/1979 | Scott et al. |
| 4,213,826 A | 7/1980 | Eddinger et al. |
| 4,234,386 A | 11/1980 | Stirling |
| 4,263,124 A | 4/1981 | Wickstrom et al. |
| 4,322,222 A | 3/1982 | Sass |
| 4,341,598 A | 7/1982 | Green |
| 4,395,309 A | 7/1983 | Esztergar |
| 4,411,766 A | 10/1983 | Garg et al. |
| 4,411,767 A | 10/1983 | Garg |
| 4,466,362 A | 8/1984 | Maxwell et al. |
| 4,534,847 A | 8/1985 | Roberts et al. |
| 4,605,790 A | 8/1986 | Wojtkowski |
| 4,678,478 A | 7/1987 | Kelland |
| 4,834,650 A | 5/1989 | Docherty et al. |
| 5,017,283 A | 5/1991 | Oder |
| 5,087,269 A | 2/1992 | Cha et al. |
| 5,114,700 A | 5/1992 | Meihack et al. |
| 5,127,586 A | 7/1992 | Oder |
| 5,151,159 A | 9/1992 | Wolfe et al. |
| 5,171,406 A | 12/1992 | Shang et al. |
| 5,176,260 A | 1/1993 | Oder |
| 5,240,592 A | 8/1993 | Meyer et al. |
| 5,326,457 A | 7/1994 | Stipanovich, Jr. |
| 5,372,497 A | 12/1994 | Coolidge et al. |
| 5,373,648 A | 12/1994 | Wolf |
| 5,401,364 A | 3/1995 | Rinker |
| 5,496,465 A | 3/1996 | Fraas |
| 5,547,549 A | 8/1996 | Fraas |
| 5,601,692 A | 2/1997 | Rinker et al. |
| 5,711,769 A | 1/1998 | Rinker et al. |
| 5,730,069 A | 3/1998 | Coolidge et al. |
| 5,997,289 A | 12/1999 | Dover |
| 8,366,882 B2 * | 2/2013 | Rinker ............... 201/8 |
| 8,394,240 B2 * | 3/2013 | Rinker ............... 201/8 |
| 8,470,134 B2 * | 6/2013 | Rinker ............... 201/29 |
| 8,673,032 B2 * | 3/2014 | French et al. ........ 44/607 |
| 2007/0272538 A1 | 11/2007 | Satchell |
| 2008/0116052 A1 | 5/2008 | Eatough et al. |
| 2009/0119981 A1 | 5/2009 | Drozd et al. |
| 2011/0011719 A1 | 1/2011 | Rinker |
| 2011/0011720 A1 | 1/2011 | Rinker |

OTHER PUBLICATIONS

Dadayburjor, et al., Coal Conversion Processes Liquefaction, Kirk-Othmer Encyclopedia of Chemical Technology, 2003, vol. 6, pp. 851-856.

Kreith, F., Principles of Heat Transfer, 2nd Ed. 1965, pp. 236-238.

Mahajan O. et al., Low-temperature air oxidation of caking coals. 1. Effect on subsequent reactivity of chars produced, FUEL, 1980, vol. 59, January, pp. 3-10.

Oder, R., Dry magnetic Separation of Ash, Sulfur, and Mercury From a Southwestern Wyoming Coal, presented at the 18th International Low Rank Fuels Symposium, Jun. 24-26, 2003, Billings, Mt, pp. 1-6.

The International Search Report and the Written Opinion, PCT/US2010/041918, dated Feb. 24, 2011.

International Search Report and Written Opinion, Application No. PCT/US11/51927, Dated Mar. 27, 2012.

International Search Report, Application No. PCT/US2012/039598, Dated Dec. 28, 2012.

Written Opinion of the International Searching Authority, Application No. PCT/US2012/039598, Dated Dec. 28, 2012.

* cited by examiner

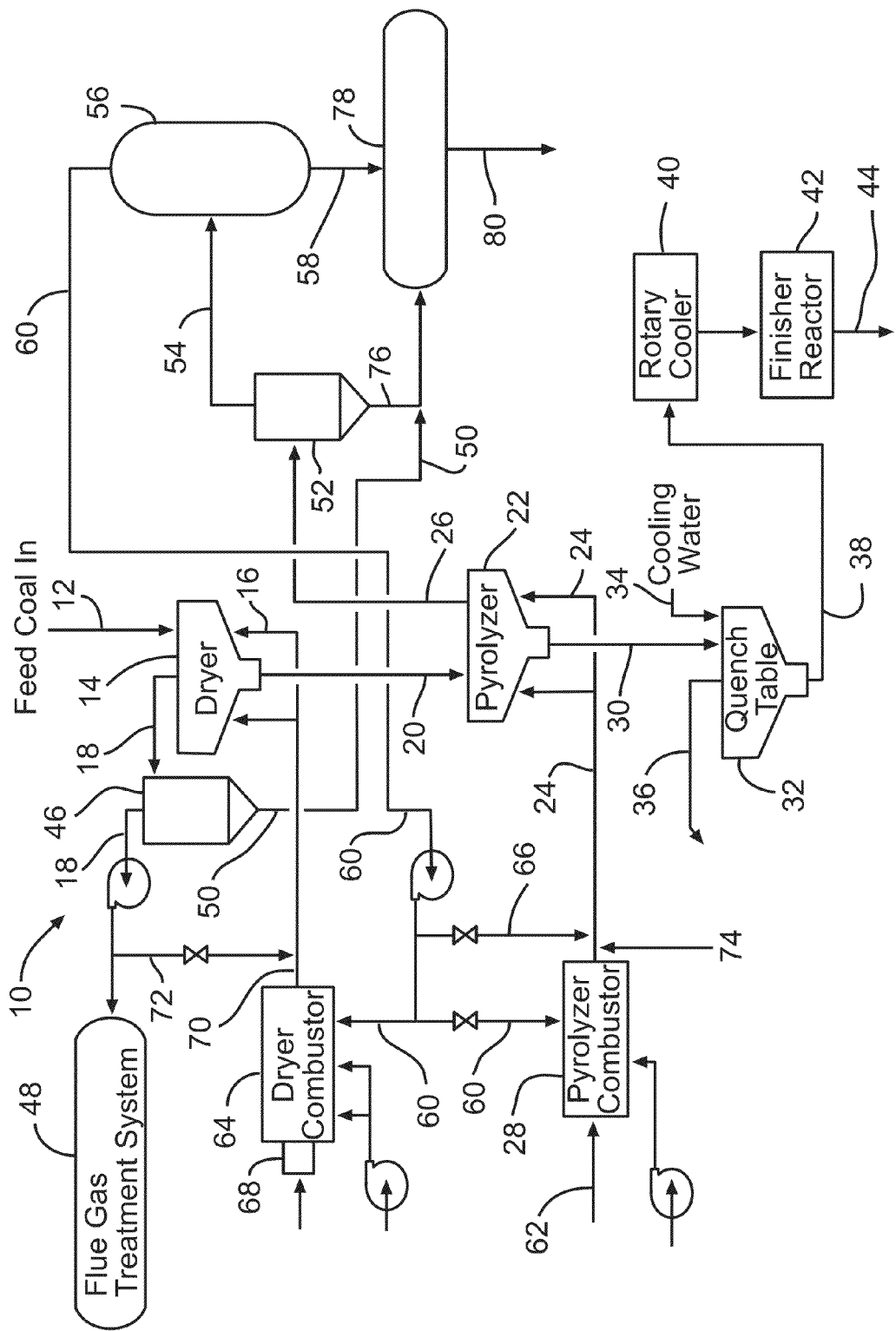

COAL PROCESSING TO UPGRADE LOW RANK COAL HAVING LOW OIL CONTENT

RELATED APPLICATIONS

None.

TECHNICAL FIELD

This invention relates to a method of processing coal, such as noncaking, noncoking coal, to form coal char in an upgraded form. More particularly, this invention relates to a process for treating low rank coal having low condensable oil content.

BACKGROUND OF THE INVENTION

A principal objective of coal benefication is to increase the calorific heating value or amount of thermal energy of the coal that can be released during a subsequent combustion process. One method of increasing the thermal energy released during combustion of coal is to decrease the amount of moisture by subjecting the coal to a drying process. It will be appreciated that moisture in coal has no heating value and, although not environmentally harmful, facilitates depletion because evaporation of the moisture consumes a portion of thermal energy released during combustion of coal.

Another known method of increasing the thermal energy released during combustion of coal is to decrease the amount of volatile matter within the coal, and thereby increase the relative amount of fixed carbon in the coal. The amount of volatile matter within coal may be decreased by subjecting the coal to a pyrolysis process. Pyrolysis of coal in an oxygen deficient atmosphere removes volatile matter, e.g. low boiling point organic compounds and some heavier organic compounds, by breaking chemical bonds during the heating process. Breaking chemical bonds within coal during the heating process increases the relative percentage of elemental carbon which provides most of the calorific heating value when coal is burned.

A by-product of the pyrolysis step is a stream of volatile gases. There are known methods for processing the volatile materials released from the pyrolysis step, to condense the volatile materials into liquids for fuel and other associated products. However, where the raw coal contains little oil in its initial state, producing significant amounts of oil and other associated products will be difficult. Therefore, it would be advantageous if there could be developed an improved coal upgrading process for low rank coal having an initial low oil content.

SUMMARY OF THE INVENTION

According to this invention there is provided a method for treating untreated low calorific coal containing moisture and organic volatiles. The method includes feeding untreated coal to a dryer, and drying the coal. The dried coal is subjected to a pyrolyzing step where oxygen-deficient gases are brought into contact with the coal, thereby lowering the volatile content of the coal and producing a stream of pyrolysis effluent gases. The pyrolysis effluent gases are subjected to a separation process to separate lean fuel gases from liquids and tars, wherein the separation process removes less than about 20 percent of the pyrolysis effluent gases as the liquids and tars, with the remainder being the lean fuel gases. The lean fuel gases are returned to the dryer combustor, the pyrolyzer combustor, or the pyrolyzer.

According to this invention there is also provided a method of treating untreated low calorific coal containing moisture and organic volatiles. The method includes feeding untreated coal to a dryer, and drying the coal. The dried coal is subjected to a pyrolyzing step where oxygen-deficient gases are brought into contact with the coal, thereby lowering the volatile content of the coal and producing a stream of pyrolysis effluent gases. The pyrolysis effluent gases are subjected to a separation process to separate lean fuel gases from liquids and tars, wherein the separation process is carried out while maintaining the pyrolysis effluent gases at a temperature above the condensation temperature of the pyrolysis effluent gases. The fuel gases are returned to the dryer combustor, the pyrolyzer combustor, or the pyrolyzer.

According to this invention there is also provided a method of treating untreated low calorific coal containing moisture and organic volatiles. The method includes feeding untreated coal to a dryer, and drying the coal. The dried coal is subjected to a pyrolyzing step where oxygen-deficient gases are brought into contact with the coal, thereby lowering the volatile content of the coal and producing a stream of pyrolysis effluent gases. The pyrolysis effluent gases are subjected to a separation process to separate lean fuel gases from liquids and tars, wherein the separation process is carried out without substantial cooling of the pyrolysis effluent gases. The fuel gases are returned to the dryer combustor, the pyrolyzer combustor, or the pyrolyzer.

Various advantages of this invention will become apparent to those skilled in the art from the following detailed description of the preferred embodiment, when read in light of the accompanying drawings.

BRIEF DESCRIPTION OF THE DRAWING

FIG. 1 is a schematic view of a coal upgrading process.

DETAILED DESCRIPTION OF THE INVENTION

This invention is directed to treating low calorific or low rank coal. In one example, low calorific coal has about 30 percent moisture, about 20 percent organic volatile content, and about 5 percent ash, with the remainder being fixed carbon. All expressions of percentages of constituents are expressed in terms of weight percent. In this example, the low calorific coal has a thermal content of less than or equal to about 8,000 Btu/pound (18.6 MJ/kg), although the Btu content can be higher or lower. Coal of such a low heat content is insufficient for many potential uses for coal, and it is desirable to treat the low calorific coal to produce coal of higher thermal content. Further, in situations where the coal must be transported long distances to reach the ultimate destination of use, it is beneficial to treat the low rank coal prior to transporting the coal.

As shown in FIG. 1, the apparatus for treating low calorific coal is indicated at 10. A supply of low calorific value raw coal is indicated at 12. Optionally the low calorific coal is processed in a sizing apparatus, such as a coal crusher, not shown, for sizing the untreated raw coal to a size desired for the additional steps of the process. Crushers and other apparatus for sizing the coal, not shown, can be used to assure that the maximum coal particle size of the crushed coal doesn't exceed a selected value for additional process steps. Apparatus for crushing and sizing are well known in the art.

The coal is introduced into the coal dryer 14 where the coal is heated with hot dryer gases 16 to remove moisture from the coal. Effluent from the coal drying process is indicated at 18. The coal dryer 14 is a rotary dryer in which the coal traverses a spiral path from the outer circumference to the center. The dryer 14 has bottom hot gas inlet vents that allow hot dryer gases to pass into contact with the coal for drying. Other dryers can also be used. The residence time for the coal in the dryer, the hot gas flow path, and the temperature of the hot dryer gases are all controlled to provide the appropriate amount and quality of heating of the coal. Any suitable dryer apparatus can be used for the coal drying step. Untreated raw low rank coal typically has an equilibrium moisture level within the range of from about 15 to about 35 percent, although it can be higher or lower. Therefore, the low rank coal 12 introduced into the dryer 14 will typically have a moisture content within that range. In the drying process, the moisture content is typically reduced to a level below about 10 percent, and in some embodiments to a level within the range of from about 3 to about 5 percent.

It is desirable to maintain the dryer hot gases 16 at a temperature low enough to preclude or prevent any significant amounts of volatilization of volatile components of coal, such as, for example, carbon monoxide and hydrocarbons. When volatilization is prevented, the dryer effluent 18 does not require a significant burn off process that would otherwise be necessary to prevent the discharge of undesirable gases. The temperature of the dryer gases 16 is typically kept at a level below about 600° F. In one embodiment, the temperature is kept below about 500° F. After the coal is dried, it exits the dryer 14 as a stream of dried coal 20.

As further shown in FIG. 1, the dried coal 20 is introduced into a pyrolyzer 22. The pyrolyzer 22 is a rotary pyrolyzer, and is a closed container to control the flow of material and gases into and out of the container. Hot gases for pyrolysis, indicated at 24, are introduced into the pyrolyzer and brought into contact with the dried coal 20. The gases that evolve or are released from the pyrolyzer 22 are the pyrolysis effluent gases 26.

The pyrolyzer 22 can be any apparatus suitable for interacting the pyrolyzing gases with the coal. For example, the pyrolyzer can be a fluidized bed apparatus. A rotary pyrolyzer can also be used. The hot pyrolyzing gases 24 are introduced at a temperature that causes the pyrolyzing process to be operated as a mild pyrolyzing process. The hot pyrolyzing gases 24 are oxygen deficient, typically having less than about 0.5 percent free oxygen, and usually having no detectable free oxygen. The temperature of the pyrolyzing gases is less than about 1100° F., and typically within the range of from about 700° F. to about 900° F. In one embodiment, the pyrolyzing gases 24 are within the range of from about 750° F. to about 850° F. In a specific embodiment the pyrolyzer gases are introduced at a temperature of about 800° F.

In the mild pyrolysis step of the process, a controlled amount of hydrogen, oxygen and carbon in the forms of H2, CH4, CO2, CO, and H2O are stripped from the coal. Other compounds such as coal tar liquids that are volatile at these temperatures are also removed from the coal. The pyrolysis conditions of temperature, gas flow rate, and residence time in the pyrolyzer 22 are closely controlled so that only a limited amount of pyrolysis effluent gases 26 is produced and the resulting processed coal 30 contains 10 to 20 percent volatile matter which is desirable for its use as a boiler fuel. People skilled in the art will understand that the pyrolysis effluent gas has value as a low heating value fuel. The pyrolysis process is controlled to substantially produce only the amount of pyrolysis gas sufficient to support the energy requirements of subsequent heating steps. These subsequent heating steps are the heating of the coal drying gases 16, the pyrolyzing gases 24, and the pyrolyzer combustor 28. The mild pyrolysis of the pyrolyzer 22 produces this limited amount of pyrolysis effluent gases while avoiding the production of significant amounts liquid fuel products. In one embodiment the pyrolyzing process is carried out in a manner in which at least 20 percent of the volatiles from the coal are driven off in the pyrolysis process.

The upgrade of the coal in the pyrolyzer 22 produces a stream of upgraded coal char, shown at 30. The coal char has been chemically transformed so that it has a lower equilibrium moisture level than the equilibrium moisture level of the raw coal 12. Typically the equilibrium moisture level is reduced in the drying and pyrolysis process to a level of less than about 10 percent, and in one embodiment to a level within the range of from about 5 percent to about 10 percent. Also, the coal char 30 leaving the pyrolyzer 22 has a significant portion of the lighter volatiles removed. The thermal value of the char 31 has been upgraded to a Btu value greater than about 10,000 Btu/lb (23.2 MJ/kg), in contrast to the typical thermal level of about 8,000 Btu (18.6 MJ/kg) for the incoming raw coal 12.

After leaving the pyrolysis step, the char 30 is quenched to quickly lower the char temperature and stop the pyrolysis reaction. The quenching step is carried out in a quench table 32, which can be any suitable apparatus for applying a stream 34 of quenching water or other quenching liquids. In one embodiment the quenching table 32 is a rotary device. The quenching liquid can be any suitable liquid, typically water, supplied from a source, not shown. Steam is produced in the quenching table, and the exiting steam is indicated at 36. It is to be understood that any suitable method and apparatus can be used to quench the treated coal.

The quenched char 38 is then sent to additional plant equipment for cooling and stabilization to reduce the tendency of the char to spontaneously ignite. The type and amount of processing in these additional steps is dependent on the final use of the char product. As shown in FIG. 1, the quenched char 38 can optionally be subjected to a rotary cooler 40 or other similar apparatus for additional cooling, and a finishing reactor 42 where the char 38 is subjected to humidification and stabilizing steps to assure that the resultant finished coal char 44 is ready and stable for shipping and ultimately a combustion process. Optionally, the cooling and finishing steps can be combined in a single apparatus. Unlike the coal formed from a mere thermal drying of the coal, this char product 44 has been upgraded from the initially supplied feed coal 12. The upgraded char 44 has a significant reduction in total moisture as well as a lower equilibrium moisture in comparison with the moisture properties of the feed coal 12. It will be understood by people skilled in the art that mere thermal drying of the coal does not reduce the equilibrium moisture of the coal. They will also understand that coal dried to a value below its equilibrium moisture will rehydrate to its equilibrium moisture by contact with atmospheric air. Further, the upgraded char product 30 has its burning characteristics significantly enhanced, and some undesirable components such as sulfur have been reduced. In a specific embodiment the resulting processed coal char had its sulfur content reduced by over 35 percent in comparison with the untreated coal. This reduction along with an increase in heating value lead to a sulfur dioxide emission reduction of over 40 percent, from about 0.9 pounds $SO_2$/million Btu (0.4 g $SO_2$/MJ) to about 0.5 pounds $SO_2$/million Btu (0.2 g $SO_2$/MJ).

Referring again to the effluent 18 from the coal drying process, the effluent is directed to a cyclone separator 46 to remove coal fines and other particulate matter, and then the effluent 18 is directed to an optional flue gas treatment system 48 to remove additional undesirable components. The gaseous discharge from the flue gas treatment system 48 is vented to the atmosphere. The resulting particulate matter, primarily coal fines, exiting the cyclone separator 46 is indicated at 50. The coal fines 50 can be converted into an agglomerated product, as discussed below.

The pyrolysis effluent gases 26 leaving the pyrolyzer 22 are first cleaned in a gas cyclone 52 to remove the coal fines or dust that have been carried away with the pyrolysis effluent gases 26 from the pyrolysis process. The pyrolysis gas 54 exiting from the cyclone 52 is then directed to a knockout drum 56 where heavier tars and coal liquids are removed from the pyrolysis gas. The pyrolysis conditions in the pyrolyzer 22 are controlled carefully but the existence of small quantities of these heavier hydrocarbons is unavoidable. The stream of heavier tars and coal liquids flowing from the knockout drum is indicated at 58. The knockout drum 56 is capable of dividing the pyrolysis gas 54 into two streams: the liquid oils and tars 58 and the gaseous lean fuel 60. No cooling step is required, although a cooling step can be used if desired. The gaseous lean fuel 60 exiting the knockout drum 56 has a temperature within the range of from about 550° F. (288° C.) to about 650° F. (343° C.), and is typically about 600° F. (316° C.). In other embodiments the temperature can be higher or lower. The lean fuel 60 contains combustible components such as $CH_4$ and CO and since the lean fuel 60 is made in a process that does not focus predominantly on the production of oils and tars, the lean fuel 60 will be much hotter (600° F. (316° C.) versus about 130° F. (54° C.)) and may be richer than would result from a process focused more on making oils and tars.

The resulting lean fuel 60 from the knockout drum 52 can be supplied to at least three different locations in the apparatus 10 for treating the low calorific coal. A portion of the lean fuel 60 is directed to the pyrolyzer combustor 28 to be combusted for the energy requirements of the pyrolysis step. A portion of the lean fuel 60 is directed to the dryer combustor 64 to be combusted to supply energy for the drying step of the process. Finally, a control portion of the lean fuel is recycled and directed along gas stream 66 to be blended into the hot pyrolysis gases 24 to control the temperature of the pyrolysis reaction.

The dryer combustor 64 is carefully controlled to oxidize the majority of combustible compounds in the lean fuel 60 at very close to stoichiometric conditions. Therefore the combustion is run with a slightly excess oxygen mixture. Too much oxygen could cause reduction of the quality of the coal in the coal dryer 12. The air or oxygen provided into the dryer combustor 64 may be preheated, and an auxiliary fuel may be supplied at 68 to insure that the combustion process will go forward. Hydrogen, carbon and sulfur are some of the elements that are oxidized.

The dryer combustor 64 is operated at a temperature above about 1400° F. (760° C.), and typically above about 1450° F. (788° C.). The combustion gases 70 exiting the dryer combustor 64 are therefore significantly hotter than is desirable for the coal dryer 14. To control the temperature of the coal drying gas 16 to be sufficiently cool to substantially prevent volatilization of the volatiles of the coal in the dryer 14, typically no greater than about 500° F. (260° C.), the combustion gases are mixed with an auxiliary stream 72 of cooler gases recycled from the cyclone 46, as shown in FIG. 1. The auxiliary steam 72 is at a temperature below about 300° F. (149° C.), and typically is about 200° F. (93° C.).

One of the uses of the lean fuel 60 is that it is supplied to the pyrolyzer combustor 28 for combustion with additional air. From time to time auxiliary fuel 62 may also be required, especially at startup. The temperature in the pyrolyzer combustor 28 must be above about 1400° F. (760° C.), and typically above 1450° F. (788° C.). The resulting gases 74 exiting the pyrolyzer combustor 28 are too hot for direct introduction into the pyrolyzer 22. Therefore, a portion of the lean fuel 60 is directed as stream 66 to be mixed with the pyrolyzer combustion gases 74 to produce the desired pyrolyzer gases 24. Since the process in the pyrolyzer 22 is a mild process, the incoming pyrolyzer gases 24 should be a temperature less than about 1100° F. (593° C.), and typically within the range of from about 700° F. (371° C.) to about 900° F. (482° C.). In some embodiments the incoming pyrolyzer gases could be higher than 1100° F.

The stream 50 of partially dried coal fines captured in the dryer cyclone 46, and the stream of coal fines 76 captured in the pyrolyzer gas cyclone 52 are mixed with the oils and coal tars 58 from the knockout drum 56. This mixture is then agglomerated in the agglomerator 78 into briquettes or other agglomerated form, indicated at 80. The agglomerated particles or briquettes 80 can be sold as a separate high heating value product, or added to the stream 44 of finished coal char. In one embodiment, approximately 5 percent of the raw feed coal by weight ends up as fines that are treated in the agglomerator 78. Other agglomerating material besides the oils and coal tars 58, or in addition to the oils and coal tars 58 can be used.

Important parameters of coal that will be suitable for use in the process described above include the type of coal, the total moisture in the raw incoming coal, the ratio of volatile matter to fixed carbon (Fuel Ratio), and the atomic hydrogen to carbon ratio. The type of coal most suitable is a non-caking coal, one that typically is a subbituminous coal, lignite coal, or brown coal. Some of the important parameters of the coal that will be suitable for use include a moisture content greater than about 15 percent, a fuel ratio less than about 0.60, and an atomic hydrogen to carbon (H/C) ratio less than about 0.7. In one embodiment the raw incoming coal has a moisture content greater than about 20 percent, a fuel ratio less than about 0.55, and an atomic hydrogen to carbon (H/C) ratio less than 0.6. The percent moisture, volatile matter, and fixed carbon in the coal are determined by ASTM D 3172 Standard Practice for Proximate Analysis of Coal and Coke. The atomic H/C ratio in the coal is determined by ASTM D 3176 Standard Practice for Ultimate Analysis of Coal and Coke.

The percent moisture, volatile matter, and fixed carbon in the coal are determined by ASTM D 3172 Standard Practice for Proximate Analysis of Coal and Coke. In this method the moisture content is defined as the weight loss when a sample of the as-received material is heated to 105° C. for one hour; the volatile matter is defined as the weight loss when the dry sample is heated to 950° C. for one hour. The ash is the material remaining after a sample is burned is the presence of air. And fixed carbon is determined by difference so that the sum of percent moisture plus volatile matter plus ash plus fixed carbon equals 100 percent. The atomic H/C ratio in the coal is determined by ASTM D 3176 Standard Practice for Ultimate Analysis of Coal and Coke. In this method the percent carbon, hydrogen, nitrogen, and sulfur are determined by combustion analysis. Oxygen is determined by difference so that the percent moisture plus ash (from the proximate analysis) plus percent carbon, hydrogen, nitrogen, sulfur, and oxygen equals 100 percent.

EXAMPLE I

Two coal samples having relatively low fuel ratios (low percentages of volatile matter relative to the fixed carbon) were studied. The characteristics of the coal samples as determined by the ASTM proximate and ultimate analyses are given in Table I. The coal samples were then subjected to a laboratory scale processor to determine oil yield. The results of the analysis are shown in Table II. Oil yield (AR) refers to as to received, and oil yield (DB) refers to dry basis.

TABLE I

Coal Characteristics of Low Liquid Coal

| Coal | % Moisture | Dry Basis % Vol | Dry Basis % F.C. | Vol/F.C. Fuel Ratio | Dry Basis % C | Dry Basis % H | H/C |
|---|---|---|---|---|---|---|---|
| A. | 15.31% | 30.17% | 62.82% | 0.48 | 76.71% | 3.93% | 0.61 |
| B | 28.57% | 30.27% | 64.79% | 0.47 | 75.26% | 3.59% | 0.57 |

TABLE II

Oil Yield

| Coal | Oil Yield (AR) | Oil Yield (DB) |
|---|---|---|
| A | 2.60% | 3.07% |
| B | 2.80% | 3.92% |

EXAMPLE II

For comparison with the coal samples analyzed in Table I, additional coal samples that do not fit the criteria listed above, but rather have higher fuel ratios, were analyzed using the same criteria. The coal characteristics are shown in Table III, and the results of the liquid analysis are shown in Table IV.

TABLE III

Coal Characteristics of High Liquid Coal

| Coal | % Moisture | Dry Basis % Vol | Dry Basis % F.C. | Vol/F.C. Fuel Ratio | Dry Basis % C | Dry Basis % H | H/C |
|---|---|---|---|---|---|---|---|
| C | 25.16% | 46.26% | 51.85% | 0.89 | 72.60% | 5.33% | 0.87 |
| D | 25.64% | 38.54% | 53.19% | 0.72 | 66.22% | 4.87% | 0.88 |
| E | 28.24% | 36.65% | 53.49% | 0.69 | 71.26% | 5.07% | 0.85 |
| F | 11.31% | 38.21% | 55.09% | 0.69 | 70.39% | 4.39% | 0.74 |
| G | 27.99% | 47.00% | 50.33% | 0.93 | 72.60% | 5.33% | 0.87 |
| H | 11.34% | 36.06% | 58.22% | 0.62 | 76.88% | 4.46% | 0.69 |
| I | 33.23% | 40.06% | 47.37% | 0.85 | 65.25% | 4.29% | 0.78 |
| J | 13.04% | 35.13% | 50.68% | 0.69 | 68.45% | 4.16% | 0.72 |

TABLE IV

Oil Yield

| Coal | Oil Yield (AR) | Oil Yield (DB) |
|---|---|---|
| C | 9.90% | 13.23% |
| D | 11.80% | 15.87% |
| E | 8.10% | 11.29% |
| F | 8.20% | 9.25% |
| G | 8.50% | 11.80% |
| H | 10.90% | 12.29% |
| I | 6.40% | 9.59% |
| J | 8.00% | 9.20% |

It can be seen that the available oil content is much higher in the samples set out in Table III when compared with the amount of oil available for samples A and B. Therefore, the value in removing oil from the coal for samples A and B is low. Accordingly, there is no need for expensive equipment for extracting significant amounts of oil from the coal where the coal is of the type known to have a low oil content.

In one embodiment, the separation process to separate lean fuel gases from liquids and tars results in removal of only a small portion of the pyrolysis effluent gases, less than about 20 percent of the pyrolysis effluent gases as the liquids and tars, with the remainder being the lean fuel gases. In another embodiment, less than about 10 percent of the pyrolysis effluent gases are removed as the liquids and tars. In a specific embodiment, less than about 5 percent of the pyrolysis effluent gases are removed as the liquids and tars, with the remainder being the lean fuel gases.

In another embodiment, the separation process to separate lean fuel gases from liquids and tars is carried out while maintaining the pyrolysis effluent gases at a temperature above the condensation temperature of the pyrolysis effluent gases. Typically the separation process is carried out at a temperature within the range of from about 600° F. to about 800° F. (about 315 to about 430° C.). In one embodiment, the separation process is carried out at a temperature within the range of from about 600° F. to about 700° F. (about 315 to about 370° C.). In yet another embodiment, the separation process is carried out without substantial cooling of the pyrolysis effluent gases.

The principle and mode of operation of this invention have been described in its preferred embodiments. However, it should be noted that this invention may be practiced otherwise than as specifically illustrated and described without departing from its scope.

What is claimed is:

1. A method of treating untreated low calorific coal containing moisture and organic volatiles, the method comprising:
    operating a dryer combustor for producing gases for drying coal;
    feeding untreated coal and the gases for drying coal to a dryer, and drying the coal;
    operating a pyrolyzer combustor for producing oxygen-deficient gases for pyrolyzing;
    subjecting the dried coal to a pyrolyzing step in a pyrolyzer wherein the oxygen-deficient gases for pyrolyzing are brought into contact with the coal, thereby producing char having a lower volatile content than that of the untreated coal and producing a stream of pyrolysis effluent gases;
    subjecting the pyrolysis effluent gases to a separation process to separate lean fuel gases from liquids and tars, wherein the separation process removes less than about 20 percent of the pyrolysis effluent gases as the liquids and tars, with the remainder being the lean fuel gases; and
    returning the lean fuel gases to one or more of the dryer combustor, the pyrolyzer combustor, or the pyrolyzer, wherein a portion of the lean fuel gases is blended into the oxygen-deficient gases for pyrolyzing.

2. The method of claim 1 in which the separation process removes less than about 10 percent of the pyrolysis effluent gases as the liquids and tars.

3. The method of claim 1 in which the untreated coal has a fuel ratio less than about 0.60.

4. The method of claim 1 in which the atomic hydrogen to carbon (H/C) ratio is less than about 0.65.

5. The method of claim 1 in which the untreated coal has less than about 35 percent volatile content.

6. The method of claim 1 in which the pyrolyzing process produces char having volatile matter in an amount within the range of from about 10 to about 20 percent.

7. The method of claim 1 in which the pyrolyzing process produces char having a volatile content that is at least 20 percent lower than that of the untreated coal.

8. The method of claim 1 in which the treating of untreated low calorific coal is effective to raise the thermal value of low calorific coal having a calorific content of less than or equal to about 8,000 Btu/pound (18.6 MJ/kg) to a resulting stream of processed coal having a thermal value of at least about 11,000 Btu/pound (25.6 MJ/kg).

9. The method of claim 1 in which the resulting processed coal char has its sulfur content reduced by over 35 percent when compared with the untreated coal.

10. The method of claim 1 including operating the pyrolyzer at a temperature within the range of from about 700° F. to about 900° F.

11. The method of claim 1 in which the oxygen-deficient gases used for pyrolyzing have an oxygen content less than about 0.5 percent.

12. A method of treating untreated low calorific coal containing moisture and organic volatiles, the method comprising:
   operating a dryer combustor for producing gases for drying coal;
   feeding untreated coal and the gases for drying coal to a dryer, and drying the coal;
   operating a pyrolyzer combustor for producing gases for pyrolyzing;
   subjecting the dried coal to a pyrolyzing step in a pyrolyzer wherein the oxygen-deficient gases for pyrolyzing are brought into contact with the coal, thereby producing char having a lower volatile content than that of the untreated coal, thereby lowering the volatile content of the coal and producing a stream of pyrolysis effluent gases;
   subjecting the pyrolysis effluent gases to a separation process to separate lean fuel gases from liquids and tars, wherein the separation process is carried out while maintaining the pyrolysis effluent gases at a temperature above the condensation temperature of the pyrolysis effluent gases; and
   returning the lean fuel gases to one or more of the dryer combustor, the pyrolyzer combustor, or the pyrolyzer, wherein a portion of the lean fuel gases is blended into the oxygen-deficient gases for pyrolyzing.

13. The method of claim 12 in which the separation process removes less than about 10 percent of the pyrolysis effluent gases as the liquids and tars.

14. The method of claim 12 in which the untreated coal has a fuel ratio less than about 0.60.

15. The method of claim 12 in which the atomic hydrogen to carbon (H/C) ratio is less than about 0.65.

16. The method of claim 12 in which the untreated coal has less than about 35 percent volatile content.

17. The method of claim 12 including producing char having volatile matter in an amount within the range of from about 10 to about 20 percent.

18. The method of claim 12 in which the treating of untreated low calorific coal is effective to raise the thermal value of low calorific coal having a calorific content of less than or equal to about 8,000 Btu/pound (18.6 MJ/kg) to a resulting stream of processed coal having a thermal value of at least about 11,000 Btu/pound (25.6 MJ/kg).

19. A method of treating untreated low calorific coal containing moisture and organic volatiles, the method comprising:
   operating a dryer combustor for producing gases for drying coal;
   feeding untreated coal and the gases for drying coal to a dryer, and drying the coal;
   operating a pyrolyzer combustor for producing gases for pyrolyzing;
   subjecting the dried coal to a pyrolyzing step in a pyrolyzer wherein the oxygen-deficient gases for pyrolyzing are brought into contact with the coal, thereby producing char having a lower volatile content than that of the untreated coal, thereby lowering the volatile content of the coal and producing a stream of pyrolysis effluent gases;
   subjecting the pyrolysis effluent gases to a separation process to separate lean fuel gases from liquids and tars, wherein the separation process is carried out without substantial cooling of the pyrolysis effluent gases; and
   returning the lean fuel gases to one or more of the dryer combustor, the pyrolyzer combustor, or the pyrolyzer, wherein a portion of the lean fuel gases is blended into the oxygen-deficient gases for pyrolyzing.

20. The method of claim 19 in which the untreated coal has a fuel ratio less than about 0.60, the atomic hydrogen to carbon (H/C) ratio is less than about 0.65, and the untreated coal has less than about 35 percent volatile content.

21. The method of claim 19 in which the pyrolyzing process produces char having volatile matter in an amount within the range of from about 10 to about 20 percent.

22. The method of claim 19 in which the treating of untreated low calorific coal is effective to raise the thermal value of low calorific coal having a calorific content of less than or equal to about 8,000 Btu/pound (18.6 MJ/kg) to a resulting stream of processed coal having a thermal value of at least about 11,000 Btu/pound (25.6 MJ/kg).

\* \* \* \* \*